United States Patent
Yamamoto et al.

(10) Patent No.: US 12,190,273 B2
(45) Date of Patent: Jan. 7, 2025

(54) WORK CONTENT ANALYZING APPARATUS, WORK CONTENT ANALYZING METHOD, PROGRAM, AND SENSOR

(71) Applicant: Toshiba Digital Solutions Corporation, Kawasaki (JP)

(72) Inventors: Kazuki Yamamoto, Kariya (JP); Toshiyuki Morishita, Kariya (JP); Jun Takahashi, Tokyo (JP); Hiroki Takenouchi, Akishima (JP); Ken Ishii, Chofu (JP); Hitoshi Kobayashi, Fuchu (JP); Takashi Kusakabe, Tokyo (JP); Yuto Akimoto, Yokohama (JP)

(73) Assignee: Toshiba Digital Solutions Corporation, Kawasaki (JP)

( * ) Notice: Subject to any disclaimer, the term of this patent is extended or adjusted under 35 U.S.C. 154(b) by 0 days.

(21) Appl. No.: 17/304,328

(22) Filed: Jun. 18, 2021

(65) Prior Publication Data
US 2021/0398053 A1 Dec. 23, 2021

(30) Foreign Application Priority Data

Jun. 22, 2020 (JP) .................... 2020-107164
Mar. 15, 2021 (JP) .................... 2021-041721

(51) Int. Cl.
G06Q 10/0639 (2023.01)
G06F 1/16 (2006.01)

(52) U.S. Cl.
CPC ....... *G06Q 10/06393* (2013.01); *G06F 1/163* (2013.01); *G06Q 10/06398* (2013.01)

(58) Field of Classification Search
None
See application file for complete search history.

(56) References Cited

U.S. PATENT DOCUMENTS

2007/0250286 A1* 10/2007 Duncan ............. A63B 23/0244
702/139
2011/0022432 A1 1/2011 Ishida et al.
(Continued)

FOREIGN PATENT DOCUMENTS

EP 3127378 B1 * 11/2019 ............. G06F 1/163
JP 2006126931 A 5/2006
(Continued)

OTHER PUBLICATIONS

Kim, Kinam, and Yong K. Cho. "Effective inertial sensor quantity and locations on a body for deep learning-based worker's motion recognition." Automation in Construction 113 (2020): 103126. (Year: 2020).*

(Continued)

*Primary Examiner* — Thomas L Mansfield
(74) *Attorney, Agent, or Firm* — Maier & Maier, PLLC

(57) ABSTRACT

A work content analyzing apparatus of the present embodiment includes a first database storing state information indicating a state of each of one or a plurality of workers in association with time information and identification information of the worker, an estimation unit estimating the work content executed by the worker on the basis of at least two pieces of state information associated with same time in the state information stored in the first database, a specification unit specifying work time spent for the estimated work content on the basis of the state information stored in the first database and the time information associated with the state information, and an analysis unit analyzing the work content on the basis of the estimated work content and the specified work time.

20 Claims, 9 Drawing Sheets

(56) References Cited

U.S. PATENT DOCUMENTS

| | | | |
|---|---|---|---|
| 2011/0254663 A1 | 10/2011 | Sakomoto et al. | |
| 2014/0361897 A1* | 12/2014 | Smith .................. | A61L 2/0088 222/52 |
| 2019/0236924 A1* | 8/2019 | Iwamoto ............ | G08B 21/0446 |
| 2021/0182995 A1* | 6/2021 | Cella .............. | G06Q 10/063118 |
| 2021/0182996 A1* | 6/2021 | Cella .................. | G06Q 30/0202 |
| 2021/0357422 A1* | 11/2021 | Cella ............. | G06Q 10/063118 |

FOREIGN PATENT DOCUMENTS

| | | | | |
|---|---|---|---|---|
| JP | 4218669 B2 | 2/2009 | | |
| JP | 2009301481 A | 12/2009 | | |
| JP | 2010271926 A | * 12/2010 | | |
| JP | 2011191836 A | 9/2011 | | |
| JP | 2011216014 A | 10/2011 | | |
| JP | 5107206 B2 | 12/2012 | | |
| JP | 5198981 B2 | 5/2013 | | |
| JP | 2015197847 A | 11/2015 | | |
| JP | 6385613 B1 | 9/2018 | | |
| JP | 6520029 B2 | 5/2019 | | |
| JP | 2019161366 A | 9/2019 | | |
| JP | 2019-204222 A | 11/2019 | | |
| WO | WO-2005002436 A1 * | 1/2005 | ........... | A61B 5/1121 |
| WO | 2010073289 A1 | 7/2010 | | |
| WO | WO-2014060726 A1 * | 4/2014 | ........... | B05B 12/004 |
| WO | WO 2018/087844 A1 | 5/2018 | | |
| WO | WO 2018/158621 A1 | 9/2018 | | |
| WO | WO 2019/130479 A1 | 7/2019 | | |
| WO | WO-2021092263 A1 * | 5/2021 | ........... | B64C 39/024 |

OTHER PUBLICATIONS

Zaltieri, Martina, et al. "A wearable device based on a fiber bragg grating sensor for low back movements monitoring." Sensors 20.14 (2020): 3825. (Year: 2020).*

Han, SangUk, et al. "Empirical assessment of a RGB-D sensor on motion capture and action recognition for construction worker monitoring." Visualization in Engineering 1.1 (2013): 1-13. (Year: 2013).*

Park, Man-Woo, and Ioannis Brilakis. "Continuous localization of construction workers via integration of detection and tracking." Automation in Construction 72 (2016): 129-142. (Year: 2016).*

Chan, Kelsey, Joseph Louis, and Alex Albert. "Incorporating worker awareness in the generation of hazard proximity warnings." Sensors 20.3 (2020): 806. (Year: 2020).*

Ishibashi, "Factory IoT where people and machines grow together-Realization of lean production by building a manufacturing platform, Special Feature: From now on, new technology for the development and penetration of IoT", Journal of the Japan Society of Mechanical Engineers, vol. 123, No. 1223, 2020, 12 pages (with English Machine Translation).

Office Action issued on Sep. 26, 2023, in corresponding European Application No. 21180059.4, 8 pages.

Anonymous: "Clock Synchronization" Wikipedia, Aug. 11, 2021, 5 pages.

Office Action issued on Jul. 23, 2024, in corresponding Japanese Application No. 2021-041721, 18 pages.

\* cited by examiner

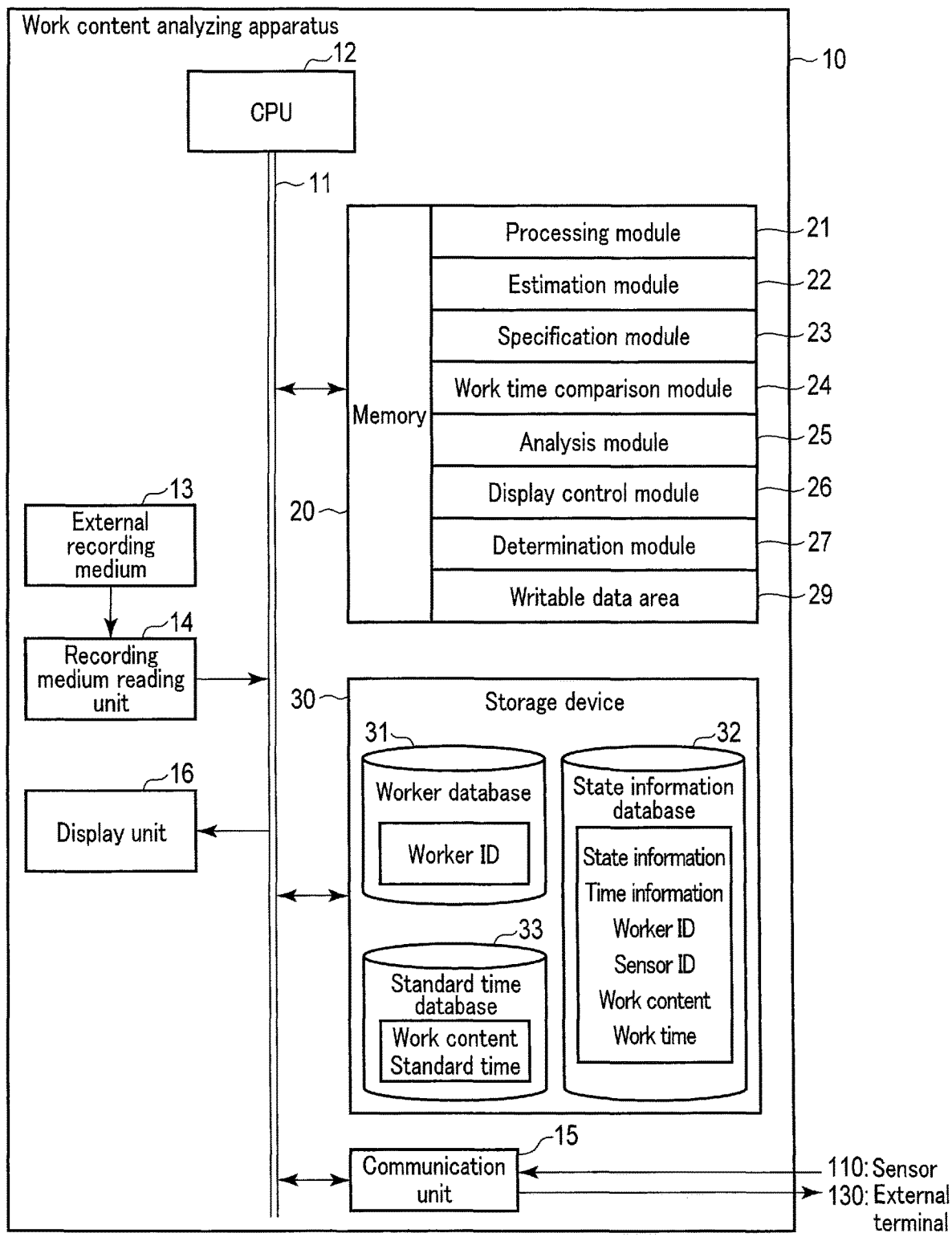
F I G. 1

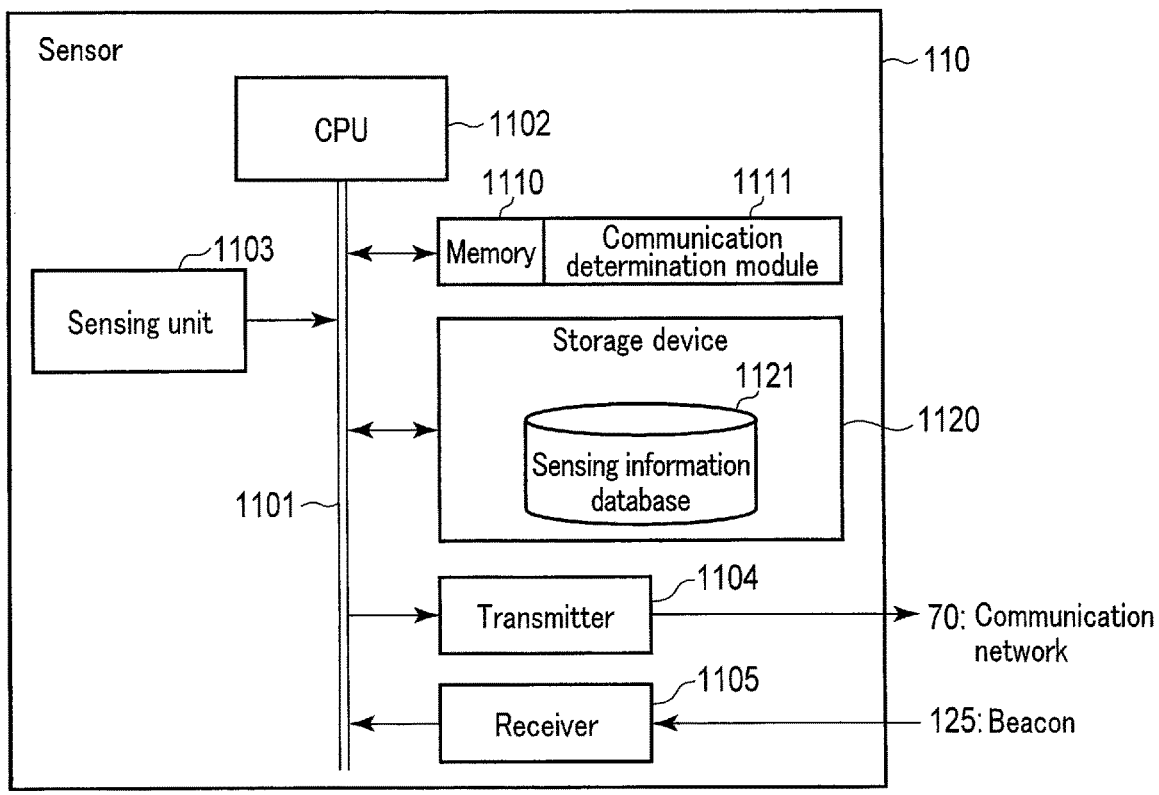
F I G. 2C
Before change : (None)→(None)→(None)→(None)→ 1 → 1 → 1 →(None)→ 1 →(None)
F I G. 3A
After change : −1 → −1 → 0 → 0 → 1 → 1 → 1 → 0 → 1 → 0
F I G. 3B
Before change : 1 → 2 → 1 → 2 → 1 → 2 → 3 → 1 → 1 → 1
F I G. 4A
After change : 1 → 1 → 1 → 1 → 1 → 1 → 1 → 1 → 1 → 1
F I G. 4B

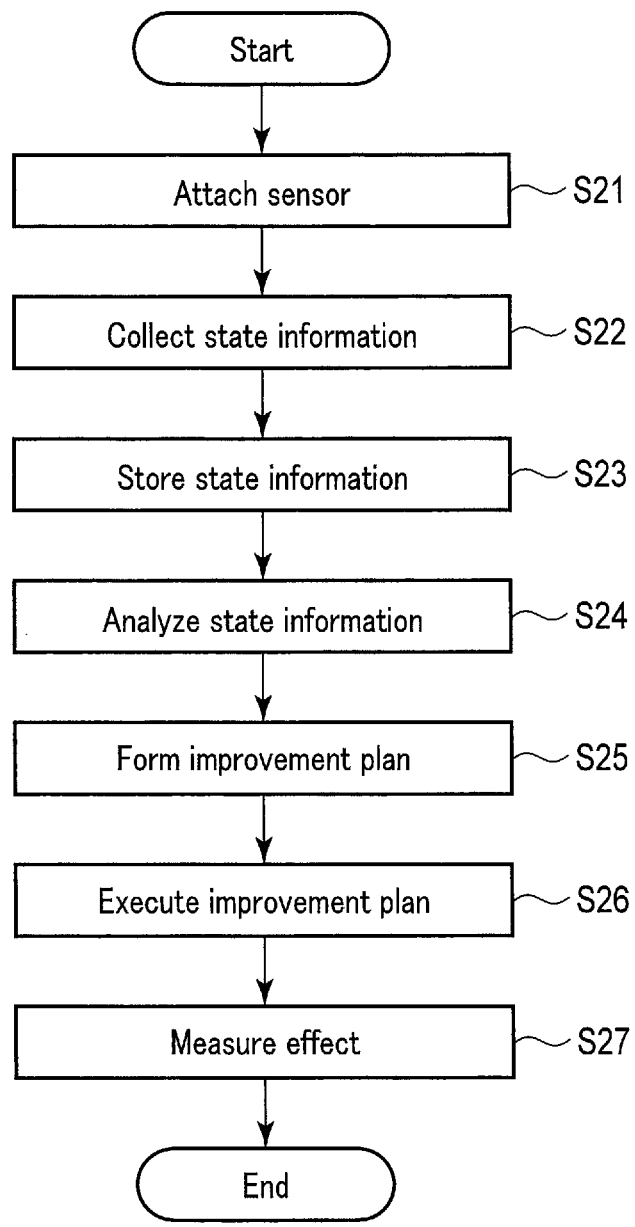
F I G. 7

WORK CONTENT ANALYZING APPARATUS, WORK CONTENT ANALYZING METHOD, PROGRAM, AND SENSOR

CROSS-REFERENCE TO RELATED APPLICATION

This application is based upon and claims the benefit of priority from Japanese Patent Applications No. 2020-107164, filed Jun. 22, 2020, and No. 2021-041721, filed Mar. 15, 2021, the entire contents of which are incorporated herein by reference.

FIELD

Embodiments described herein relate generally to a work content analyzing apparatus, work content analyzing method, program, and a sensor for the work content analyzing apparatus to analyze the work contents of the worker in a factory or the like on the basis of the state of the worker.

BACKGROUND

Generally, to improve the work efficiency, it is generally executed to measure the time required for the actual work and analyze the work process to visualize the actual work and standardize the process on the basis of the measurement results and the analysis results. Each of workers works in accordance with the standardized process.

However, such measurement of the work time necessary for analyzing the work process in conventional art is performed by a measurer using a stopwatch. This incurs more labor costs.

An IoT may be used to measure the work time without using extra labor costs. Specifically, this is an idea of substituting human work with an IoT.

However, an amply provided IoT requires renovation of the factory equipment itself, and is difficult to retrofit in the equipment of the factory already in operation.

As described above, executing analysis of work contents requires extra labor costs for data collection to achieve it, and reduction in labor cost requires remodeling of the equipment. For this reason, execution of analysis of work contents is not easy.

For this reason, there is no margin to take measures to improve the work efficiency in all the related factories, and the measures to improve the work efficiency in each of the factories are left to each of the factories in the present circumstances.

BRIEF DESCRIPTION OF THE DRAWINGS

FIG. 1 is a block diagram illustrating an electronic circuit configuration example of a work content analyzing apparatus to which a work content analyzing method according to the first embodiment is applied.

FIG. 2C is a block diagram illustrating an electronic circuit configuration example of a sensor.

FIG. 3A illustrates an example of state information (sensing information illustrating an operating state of the equipment) stored in a state information database in a time-series manner in conventional art.

FIG. 3B illustrates another example of state information (sensing information illustrating an operating state of the equipment) stored in the state information database in a time-series manner.

FIG. 4A is a diagram illustrating an example of time-series change of sensing information indicating the area number as positional information.

FIG. 4B is a diagram illustrating an example of the state information determined by executing arithmetic processing for the sensing information illustrated in FIG. 4A.

FIG. 7 is a flowchart illustrating a flow of business operation improvement.

DETAILED DESCRIPTION

Embodiments of the present invention will be described hereinafter with reference to drawings.

A work content analyzing apparatus of the present embodiment is a work content analyzing apparatus analyzing work content of a worker on the basis of a state of the worker, including a first database storing state information indicating a state of each of one or a plurality of workers in association with time information and identification information of the worker, an estimation unit estimating the work content executed by the worker on the basis of at least two pieces of state information associated with same time in the state information stored in the first database, a specification unit specifying work time spent for the estimated work content on the basis of the state information stored in the first database and the time information associated with the state information, and an analysis unit analyzing the work content on the basis of the estimated work content and the specified work time. The state information includes at least any one of positional information of the worker, motion information indicating whether a hand of the worker is moving, and information indicating an operating state of an equipment around the worker.

First Embodiment

A work content analyzing apparatus to which a work content analyzing method according to the first embodiment is applied will be explained hereinafter.

FIG. 1 is a block diagram illustrating an electronic circuit configuration example of a work content analyzing apparatus to which the work content analyzing method according to the first embodiment is applied.

Figure 2A:
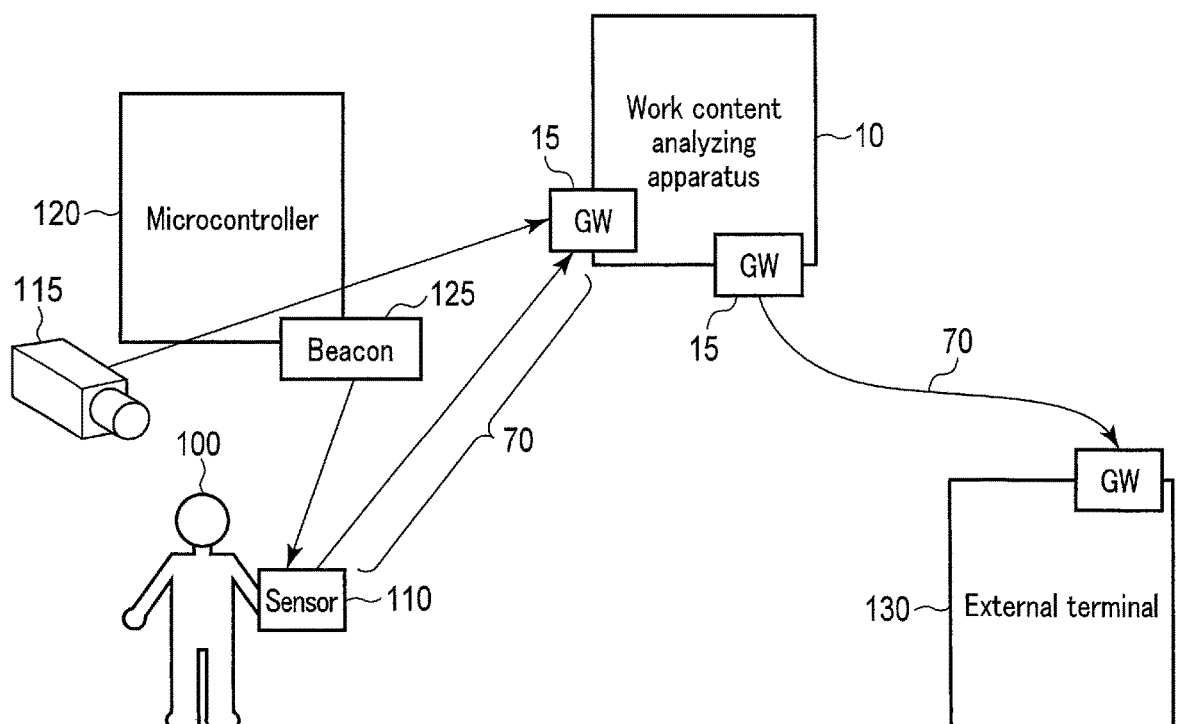
FIG. 2A is a conceptual diagram illustrating an example of connection relation (including a camera) between the work content analyzing apparatus and another device.

FIG. 2A is a conceptual diagram illustrating an example (including a camera) of connection relation between the work content analyzing apparatus and another device.

A work content analyzing apparatus 10 is an apparatus analyzing work contents executed by workers of a factory or the like.

An electronic circuit of the work content analyzing apparatus 10 includes a CPU 12, a recording medium reading unit 14, a communication unit 15, a display unit 16, a memory 20, and a storage device 30 mutually connected via a bus 11, as illustrated in FIG. 1.

The memory 20 stores a processing module 21, an estimation module 22, a specification module 23, a work time comparison module 24, an analysis module 25, a display control module 26, and a determination module 27, as programs achieving the work content analyzing apparatus 10.

The program modules 21 to 27 may be stored in advance in the memory 20, or read from an external recording medium 13, such as a memory card, into the memory 20 via the recording medium reading unit 14 and stored therein. The program modules 21 to 27 are set unrewritable.

In the memory 20, a writable data area 29 is secured as an area storing rewritable data, in addition to such an area unrewritable by the user.

The CPU 12 serves as an example of one or a plurality of processors capable of executing each of the program modules 21 to 27, and controls operations of each of units in the circuit in accordance with each of the program modules 21 to 27.

The storage unit 30 includes a worker database 31, a state information database 32, and a standard time database 33.

The worker database 31 stores, for example, worker IDs (such as employee numbers) of respective workers 100 of the factory.

The state information database 32 stores sensing information from each of sensors 110 attached to the respective workers 100, as state information indicating the state of the worker 100, in association with the time information, the worker ID, and the sensor ID.

The state information database 32 is capable of also storing sensing information of a sensor 110 installed in the vicinity of or around the worker 100, such as a camera, as state information of the worker 100, in association with the time information, the worker ID, and the sensor ID. In this case, although the sensor 110 is not attached to the worker 100, the sensing information of the sensor 110 is stored in association with the worker ID of the worker 100 existing in the vicinity of the sensor 110, such as the worker 100 existing within a predetermined distance from the sensor 110.

The state information may include positional information of the worker 100, motion information indicating whether the hand of the worker 100 is moving, information indicating the operating state of the equipment around the worker 100, movement information indicating whether the worker 100 is moving, vital information of the worker 100, voice information of the worker 100, ambient sound information of the worker 100, and ambient image information of the worker 100.

As the state information, in addition to the sensing information (hereinafter also referred to as "first state information") acquired from the sensor 110 (including the camera 115), the state information database 32 may also store state information (hereinafter also referred to as "second state information") acquired by performing mathematical arithmetic processing on the sensing information (first state information) in the same manner, as state information indicating the state of the worker 100, in association with the time information, the worker ID, and the sensor ID. The state information is not limited to the sensing information (first state information) from the sensor 110, but may also include image information from the camera 115 and a signal from, for example, a patlamp.

The state information may be acquired not only as sensing information transmitted from each of sensors 110 attached to the respective workers 100 and/or the camera 115 installed in a fixed point and controlled with a microcontroller 120, but also acquired on the basis of the sensing information, such as second state information acquired from the first state information described above.

A plurality of types of sensors 110 may be attached to each of the workers 100, not one type of sensor.

The sensors including the sensors 110 and/or the camera 115 serve as IoT devices to visualize the motion of the worker. Specific types of the sensors include a position sensor measuring the position of the worker 100 via a GPS function, a WiFi (registered trademark) function, a Bluetooth (registered trademark) function, or a beacon 125, an acceleration sensor detecting motion of the hand of the worker 100, a vital sensor measuring vital information of the worker 100, such as the pulse of the worker 100, a microphone detecting voice of the worker 100, a sound sensor detecting sound around the worker 100, and an image sensor, such as a camera imaging an image on the line of sight of the worker 100, but are not limited thereto.

The sensors are attached to the front surface of the body, the left or right side of the waist, the arm, the wrist, the neck, the shoulder, the ear, and/or the head or the like of the worker 100 to easily receive radio waves from the beacon 125. In particular, the sensor 110 acquiring motion information, such as the acceleration sensor described above, is attached to the dominant arm or the dominant hand of the worker 100.

As the position sensor, a wearable terminal including a smartphone may be applied. In this case, the smartphone is put into the waist holder and fixed with a belt, or attached by hooking the smartphone on a belt loop of the worker 100. When the attached position is on the worker's back side, the communication unit 15 have difficulty in receiving a signal from the smartphone. For this reason, the smartphone is desirably attached to the front side and/or the left or right side of the waist of the worker 100. As another example, the smartphone may be held in a trouser pocket or a chest pocket of the worker 100.

As the vital sensor, a wrist-band type device may be used. In this case, because attaching devices to both arms or both hands of the worker 100 may obstruct the work, the vital sensor is preferably attached to the dominant arm or the dominant hand of the worker 100 such that the motion and/or the work content of the worker 100 can be recognized in detail with a minimum structure.

As the sound sensor, a headset type device may be used. In this case, the device may be used in a state of being hung on the neck of the worker 100 or put on the shoulder of the worker 100.

As the sound sensor, an earphone-type device may be used. In this case, the device may be used in a state of being attached to the ear of the worker 100.

As the imaging sensor, a smartglass-type device may be used. In this case, the device may be used in a state of being attached to the head of the worker 100.

For example, the camera 115 installed in a fixed point is also included in the sensors, although it cannot be attached to the worker 100, but the sensors are not limited thereto.

Figure 2B:
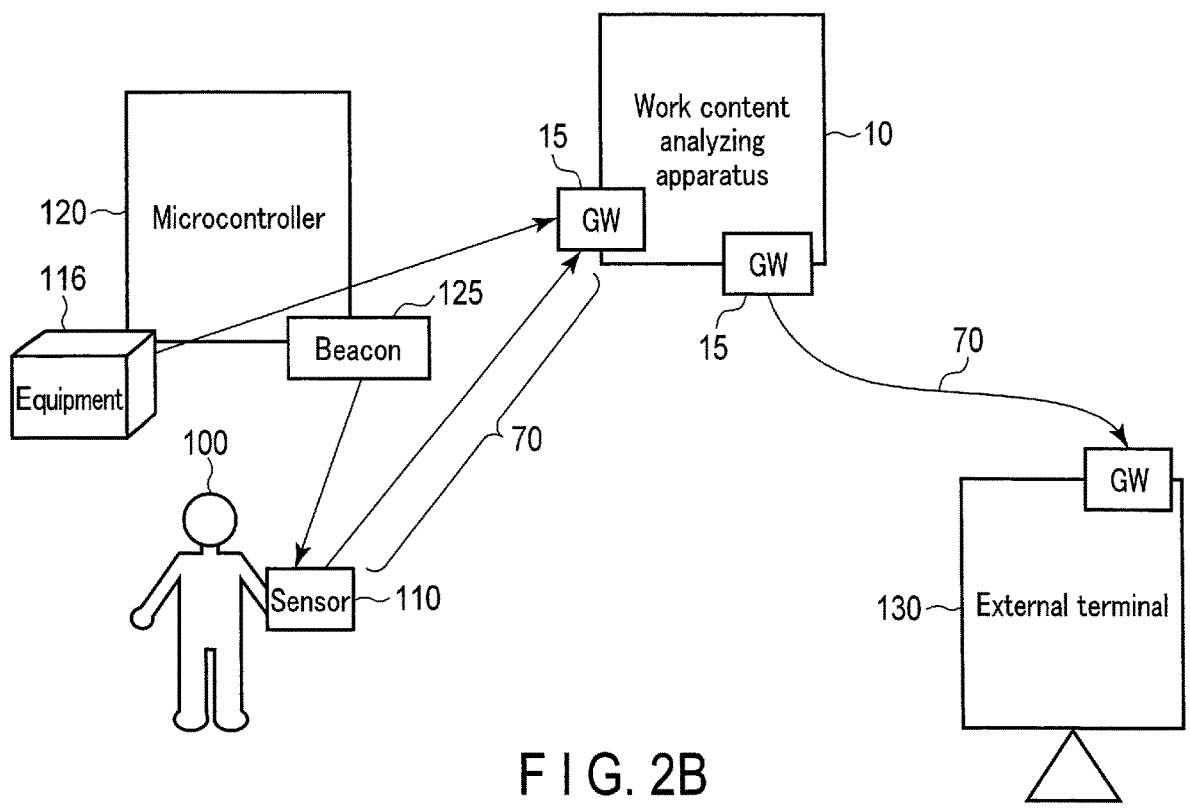
FIG. 2B is a conceptual diagram illustrating an example (including the equipment) of connection relation between the work content analyzing apparatus and another device.

FIG. 2B is a conceptual diagram illustrating an example (including the equipment) of connection relation between the work content analyzing apparatus and another device.

The following is an explanation of a method for acquiring operation information of the equipment around the worker 100 in the state information with reference to FIG. 2B.

The connection relation illustrated in FIG. 2B is different from FIG. 2A in that the former includes equipment 116 instead of the camera 115 illustrated in FIG. 2A, and the same in the other constituent elements. For this reason, the following explanation illustrates a point different from FIG. 2A.

The equipment 116 transmits operation information of the equipment 116 to the communication unit 116 by the control of the microcontroller 120. A sensor (not illustrated) to acquire operation information may be installed in the equipment 116 to transmit the operation information acquired from the sensor to the communication unit 15.

In this manner, the work content analyzing apparatus 10 is capable of acquiring operation information of the equipment 116 around the worker 100 serving as one piece of the state information.

FIG. 2C is a block diagram illustrating an electronic circuit configuration example of a sensor.

The block diagram in FIG. 2C illustrates a configuration example generally illustrating the sensor 110 formed of many types as described above.

The sensor 110 generally includes a CPU 1102, a sensing unit 1103, a transmitter 1104, a receiver 1105, a memory 1110, and a storage device 1120 mutually connected via a bus 1101.

The CPU 12 is a processor controlling operations of each of the circuit units described above and mutually connected via the bus 1101.

The sensing unit 1103 is a unit acquiring sensing information of the worker 100. For example, the sensing unit 1103 corresponds to a detection unit detecting acceleration when the sensor 110 is an acceleration sensor, the sensing unit 1103 corresponds to a detection unit detecting the vital value, such as the pulse, when the sensor 110 is a vital sensor, a sound collection unit detecting sound when the sensor 110 is a sound sensor, an imaging element when the sensor 110 is a camera, and a GPU function, a WiFi function, or a Bluetooth function when the sensor 110 is a position sensor.

The sensor 110 may serve as a position sensor measuring the position of the worker 100 via the beacon 125. In this case, the receiver 1105 receives a signal from the beacon 125 as sensing information. The beacon 125 is capable of changing its transmission radio wave intensity.

When the sensing unit 1103 and the receiver 1105 acquire sensing information as described above, the sensing unit 1103 and the receiver 1105 output the sensing information to the storage device 1120. The storage device 1120 stores a sensing information database 1121 storing sensing information, and stores sensing information output from the sensing unit 1103 and the receiver 1105.

The storage device 1120 is formed of, for example, a SSD (Solid State Drive) or a HDD (Hard Disk Drive).

The memory 1110 stores a communication determination module 1111 as a program included in the sensor 110.

The communication determination module 1111 determines whether the sensor 110 can communicate with the work content analyzing apparatus 10.

When it is determined with the communication determination module 1111 that communication between the sensor 110 and the work content analyzing apparatus 10 is impossible (specifically, when the communication determination module 1111 determines that the sensor 110 cannot communicate with the work content analyzing apparatus 10), sensing information is kept stored in the sensing information database 1121.

When it is determined with the communication determination module 1111 that communication between the sensor 110 and the work content analyzing apparatus 10 is possible, the transmitter 1104 transmits the sensing information stored in the sensing information database 1121 to the work content analyzing apparatus 10 via a communication network 70 at regular time intervals (for example, every 5 seconds or every 10 seconds), regardless of whether any new sensing information is acquired.

Each of the sensors 110 is provided with a sensor ID serving as identification information of the sensor, and associated with the worker ID of the worker 100 to which the sensor 110 is attached. When the transmitter 1104 transmits sensing information as state information to the work content analyzing apparatus 10, the transmitter 1104 transmits the sensing information together with the sensor ID and the worker ID thereof.

In particular, when the sensor 110 is the camera 115, the transmitter 1104 transmits the image information serving as the sensing information to the work content analyzing apparatus 10 together with the sensor ID.

As illustrated with reference to FIG. 1 again, the communication unit 15 of the work content analyzing apparatus 10 is connected to the communication network 70, receives the sensor ID, the worker ID, and the sensing information transmitted from each of the sensors 110 via the communication network 70, and transmits the received sensor ID, the worker ID, and the sensing information to the processing module 21. In the same manner, the communication unit 15 receives the sensor ID and image information serving as the sensing information transmitted from the camera 115, and transmits the received sensor ID and the image information serving as the sensing information to the processing module 21.

As illustrated in FIG. 2A and FIG. 2B, the communication unit 15 is also capable of outputting data necessary for graph display to the external terminal 130 via the communication network 70 to display, on the external terminal 130, a graph or the like displayed on the display unit 16 with the display control module 26, as described later.

As described above, the sensing information transmitted as state information from the sensors 110 includes positional information of the worker 100, motion information relating to the motion of the hand of the worker 100, movement information relating to movement of the worker 100, vital information of the worker 100, voice information of the worker 100, ambient sound information of the worker 100, image information on the line of sight of the worker 100, and image information of the worker 100 and the like. As described later, motion information and positional information of the worker 100 can be acquired with the processing module 21 from the image information from the camera 115.

The state information database 32 serves as a database to store state information, and is capable of using time information measured with an internal clock (not illustrated) of the work content analyzing apparatus 10, as time information. The state information database 32 is also capable of time information synchronized with an external system clock (clocking means) connected with the work content analyzing apparatus 10.

When synchronization with the clocking means of the connected system is impossible, the time of the work content analyzing apparatus 10 itself may be set as the standard time, and each of the sensors 110 may use the time synchronized with the work content analyzing apparatus 10, to avoid a difference in time between the sensors.

The standard time database 33 stores standard time determined in advance for each of work contents. For example, the standard time may be the target time determined in advance for each of work contents or the time spent by a skilled worker to finish the work content, but is not limited thereto.

The storage device 30 storing the databases 31 to 33 is also formed of, for example, a SSD (Solid State Device) or a HDD (Hard Disk Drive), in the same manner as the storage device 1120.

The processing module 21 receives the sensing information transmitted from the communication unit 15 together with the sensor ID and/or, when transmitted, the worker ID, and determines whether any processing is required for the sensing information. The processing module 21 executes necessary processing for the sensing information requiring processing, acquires state information, and transmits the state information to the state information database 32 together with the sensor ID and the worker ID thereof. By contrast, when the sensing information requires no processing, the processing module 21 executes no processing for the sensing information, and transmits the sensing information as state information to the state information database 32 together with the sensor ID and the worker ID.

Examples of sensing information requiring processing include image information from the camera 115. Processing for the image information is, for example, specifying the imaged worker 100 from the image information by an AI technique or the like, specifying the worker ID of the worker 100, detecting the motion information and the positional information of the specified worker 100, and using the detected motion information and the positional information as state information. As described above, when image information is processed, the processing module 21 particularly functions as an image processing module. In addition, sensing information from the acceleration sensor may be subjected to processing using an AI technique or the like. It should be noted that sensing information requiring processing is not limited thereto.

When state information is transmitted together with the sensor ID and the worker ID, the state information database 32 stores the state information, the sensor ID, and the worker ID in association with the time information.

As described above, the work content analyzing apparatus 10 is capable of storing the sensing information transmitted from the sensors 110 (including the camera 115) as state information. However, even when the work content analyzing apparatus 10 is normal, there are cases where no sensing information is transmitted and state information cannot be acquired due to a communication error of the sensor 110 (including the camera 115) or the like. Conversely, although communication from the sensor 110 (including the camera 115) has no problem, there are cases where no sensing information can be received and state information cannot be acquired due to any trouble in the work content analyzing apparatus 10 or the like.

The determination module 27 determines whether the work content analyzing apparatus 10 normally operates. The determination module 27 is capable of determining whether the work content analyzing apparatus 10 normally operates by, for example, monitoring operations of the CPU 12 and/or the communication unit 15.

In the case where no state information can be acquired, when the determination module 27 determines that the work content analyzing apparatus 10 is normal, the processing module 21 stores first fixed data (for example, "0") as state information in the state information database 32. When the determination module 27 determines that the work content analyzing apparatus 10 is not normal, the processing module 21 stores second fixed data (for example, "−1") as state information in the state information database 32. The fixed information is not limited to "0", but may be a character string, such as "NULL".

Storing such fixed data in the state information database 32 enables the following matters.

The case where the state information is sensing information indicating the operating state of the equipment 116 will be explained as an example. In conventional art, when sensing information "1" indicating the operating state is received from the sensor monitoring the equipment 116, information "1" is stored as state information in the state information database 32. This enables the work content analyzing apparatus 10 to determine that the equipment 116 is in operation.

However, in this structure, no state information is stored when no sensing information is received. Accordingly, no state information is stored in the case where no sensing information can be received due to a communication error of the sensor monitoring the equipment 116 or the like even when the work content analyzing apparatus 10 is normal or, conversely, in the case where no sensing information can be received due to malfunction of the work content analyzing apparatus 10 although communication from the sensor has no problem.

FIG. 3A illustrates an example of state information (sensing information illustrating an operating state of the equipment) stored in the state information database 32 in a time-series manner in conventional art.

For example, in the first four time points, because no state information was stored, the state information thereof is illustrated as "none". In the subsequent and successive three time points, because state information was received, information "1" was stored in the state information database 32. Thereafter, "none", storage of information "1", and "none" followed.

As described above, when no state information is stored in the state database 32, it is entirely unclear whether the cause thereof is any problem on the work content analyzing apparatus 10 side or any problem in an element other than the work content analyzing apparatus 10.

By contrast, in the present embodiment, when no state information can be acquired even when the determination module 27 determines that the work content analyzing apparatus 10 is normal, the processing module 21 stores state information "0" in the state information database 32. By contrast, when no state information can be acquired in the case where the determination module 27 determines that the work content analyzing apparatus 10 is not normal, the processing module 21 stores state information "—1" in the state information database 32. The state information is not limited to "0", but may be a character string, such as "NULL".

FIG. 3B illustrates an example of state information (sensing information illustrating an operating state of the equipment) stored in the state information database in a time-series manner in the present embodiment.

As illustrated in FIG. 3B, in the present embodiment, the state "none" is avoided. When FIG. 3B is compared with FIG. 3A, the first two "none" illustrated in FIG. 3A are illustrated as "−1" in FIG. 3B. This indicates the state in which no state information was acquired due to the abnormal state of the work content analyzing apparatus 10. In addition, the other four "none" illustrated in FIG. 3A are illustrated as "0" in FIG. 3B. This indicates the state in which no state information was acquired although the work content analyzing apparatus 10 was normal.

As another example of the processing, the processing module 21 acquires second state information by executing mathematical arithmetic processing for one or a plurality of pieces of first state information in a plurality of pieces of state information. Thereafter, the processing module 21 stores the first state information and the second state information in the state information database 32. In this manner, another state information can be derived from one piece of state information.

For example, averaging and/or majority decision may be adopted as the mathematical arithmetic processing. The case of applying it to sensing information indicating positional information will be explained hereinafter as an example of adopting averaging and/or majority decision as the mathematical arithmetic processing.

FIG. 4A is a diagram illustrating an example of time-series change of sensing information indicating the area number as positional information.

The example illustrated in FIG. 4A illustrates 10 pieces of sensing information arranged in a time-series manner. The 10 pieces of sensing information indicate respective pieces of positional information detected for respective seconds with the sensor 110 attached to the worker 100. The numbers indicate the area numbers. Specifically, FIG. 4A indicates the area numbers of the areas in which the worker 100 was located for respective seconds in 10 seconds. This example illustrates that the worker 100 was located in area 1 for the first second, moved to area 2 after 1 second, returned to area 1 after the next 1 second, and moved between areas 1, 2, and 3 thereafter every second rapidly.

However, it is known that erroneous detection often occurs in position detection. In addition, actually, it is hard to occur that the position of the worker 100 frequently moves between three areas like teleportation for short time. For this reason, when the sensing information indicating positional information is dealt with as state information, it is preferable to determine state information by subjecting raw data to arithmetic processing, such as averaging the pieces of sensing information or performing majority decision within a desired fixed time period, such as 10 seconds, instead of using raw data without any processing.

FIG. 4B is a diagram illustrating an example of the state information determined by executing arithmetic processing for the sensing information illustrated in FIG. 4A.

In 10 seconds illustrated in the example of FIG. 4A, the positional information indicating area 1 occurred six times, that is, most frequently. For this reason, in the case of "1→2→1", the former and the latter pieces "area 1" are determined as correct and settled. By contrast, because the middle piece "area 2" is not realistic and should be considered to be actually "area 1", the information is corrected to "1→2→1". In addition, in the case where the positional information is "1→2→3→1", the first and the last pieces "area 1" is determined as correct information and settled. In view of the information described above, because the middle pieces "area 2" and "area 3" are not realistic and should be considered to be actually "area 1", they are regarded as "area 1" and the information is corrected to "1→1→1→1".

By the arithmetic processing described above, the time-series state information as illustrated in FIG. 4B is acquired from the sensing information illustrating time series as illustrated in FIG. 4A.

Although not illustrated, under the condition that the positional information indicates area 1 most frequently in the same manner as FIG. 4A, when the positional information indicates time series "1→2→2→1", the first and the last pieces "area 1" are determined as correct information and settled. When the area 1 and the area 2 are close to each other, it is possible that the worker moves from the area 1 to the area 2, stays at the area 2 for two seconds, and thereafter returns to the area 1. For this reason, the information "1→2→2→1" can be settled as it is.

As explained with reference to FIG. 1 again, the estimation module 22 estimates the work content executed by the worker 100 on the basis of at least two pieces of state information associated with the same time in the pieces of state information of the worker 100 stored in the state information database 32. In the present specification, examples of the work content include not only useful work and ancillary work, such as manual work and movement work to move a hand cart, but also unuseful work, such as simple walking, a standstill at the position, and a break.

For example, when the estimation module 22 estimates the work content of the worker 100 (#1), the estimation module 22 uses the state information associated with the worker ID of the worker 100 (#1) in the state information stored in the state information database 32. In addition, the estimation module 22 notes at least two pieces of state information associated with the same time on the basis of the time information associated with the state information and the sensor ID associated with the state information, and estimates the work content executed by the worker 100 (#1). At least two pieces of state information associated with the same time are not limited to the state information of one worker, such as the worker 100 (#1) in the present example, but may be pieces of state information of a plurality of workers, such as the worker 100 (#1) in the present example and another worker 100 (#2).

The following is an explanation of an example the case where at least two pieces of state information are positional information from the positional sensor of one worker and acceleration information from the acceleration sensor thereof, as an example of the case where at least two pieces of information are two pieces of state information from one worker (such as the worker 100 (#1)). In this case, when the positional information indicates that the worker is in a work area and the acceleration information indicates a value (a state in which the worker's hand is moving for manual work) larger than a predetermined value, the estimation module 22 can estimate that the work content of the worker 100 (#1) is manual work.

By contrast, when the positional information does not change at all and the acceleration information indicates a state (a state in which the hand is hardly moving) of indicating no acceleration larger than the predetermined value, the estimation module 22 can estimate that the worker 100 (#1) is at a standstill, that is, the worker is performing no work. In this case, by further considering the time information, when the time is in the break time of the worker 100 (#1), the estimation module 22 can estimate that the worker 100 (#1) is on a break. When the time is not in the break time, the estimation module 22 can estimate that the worker 100 (#1) is in a waiting state.

As another example of the case where at least two pieces of state information are two pieces of state information of one worker (for example, worker 100 (#1)), when the positional information changes with a lapse of time and the acceleration information does not change, the estimation module 22 can estimate that the worker 100 (#1) is moving. However, in this state, the estimation module 22 cannot distinguish the state in which the worker 100 (#1) is moving due to work, such as work of pushing a hand cart, from the state in which the worker 100 (#1) is simply walking, not any work. In such a case, the estimation module 22 further considers the sound from the microphone as state information, and distinguish the state in which the worker 100 (#1) is moving a hand cart, from the state in which the worker 100 (#1) is simply walking, in accordance with whether sound generated with movement of the hand cart has been detected.

The following is an explanation of the case where at least two pieces of state information are positional information from the positional sensor of the worker 100 (#1) and voice information from the microphone thereof and positional information from the positional sensor of the worker 100 (#2) and voice information from the microphone thereof, as an example of the case where at least two pieces of state information are pieces of state information of a plurality of workers (for example, two workers formed of the worker 100 (#1) and the worker 100 (#2)). In this case, when the positional information of the worker 100 (#1) and the positional information of the worker 100 (#2) indicate the same work area and the voice information of the worker 100 (#1) and the voice information of the worker 100 (#2) indicate that the worker 100 (#1) and the worker 100 (#2) are talking about work, the estimation module 22 can estimate that the worker 100 (#1) and the worker 100 (#2) are working together and estimate the work content on the basis of the details of the talk.

As another example of the case where at least two pieces of state information are pieces of state information of a plurality of workers (for example, two workers formed of the worker 100 (#1) and the worker 100 (#2)), at least two pieces of state information can be set as at least any two of the positional information of the worker 100, the motion information indicating whether the hand of the worker 100 is moving, and information indicating the operating state of the equipment around the worker 100.

Using two pieces of data formed of positional information and motion information enables estimation of the work content in each of work places.

Using two pieces of data formed of positional information and equipment information enables estimation of the action of the worker 100 in accordance with the operating state of the equipment.

Using two pieces of data formed of motion information and equipment information enables estimation of work of the worker 100 in accordance with the operating state of the equipment.

In addition, estimation of work as a group is enabled by using data of the group formed of a plurality of workers 100 for the three cases described above.

The examples described above are mere examples. The estimation module 22 is capable of estimating various work contents on the basis of combinations of other various pieces of state information. The estimation module 22 stores the estimated work content in the state information database 32 in association with the corresponding state information.

The specification module 23 specifies the work time spent for the work content estimated with the estimation module 22, on the basis of the state information of the worker 100 stored in the state information database 32 and the time information associated with the state information. For example, when the estimation module 22 estimates that the worker 100 is performing manual work, the specification module 23 specifies the time period ranging from the time corresponding to the time information corresponding to the start timing of the manual work to the time corresponding to the time information corresponding to the end timing of the manual work, as the work time spent for the manual work. The specification module 23 stores the work time specified as described above in the state information database 32 in association with the corresponding state information.

The work time comparison module 24 compares the work time specified with the specification module 23 with the standard time stored in the standard time database 33 for the work content estimated with the estimation module 22. The comparison result can be used as a difference between the work time and the corresponding standard time. For example, when manual work is estimated as the work content with the estimation module 22, the work time specified for the manual work with the specification module 23 is 30 minutes, and the time "33 minutes" is stored as the standard time of the manual work in the standard time database 33, the work time comparison module 24 acquires a comparison result that "standard time+3 minutes" was spent on the manual work. As another example, the comparison result may be expressed as a percentage (in this case, "standard time+10%") for the standard time, not the difference.

The analysis module 25 analyzes the work content of the worker 100 from various points of view using the comparison result acquired with the work time comparison module 24 and/or information stored in the state information database 32 and the standard time database 33.

The display control module 26 displays a graph or the like illustrating various analysis results executed with the analysis module 25 on the display unit 16, and/or displays it on the external terminal 130 via the communication network 70. Examples of the graph include a comparison result of the work time acquired with the work time comparison module 24 and a work result diagram prepared on the basis of the time period specified with the specification module 23.

Specific examples of analysis executed with the analysis module 25 and/or analysis results displayed with the display control module 26 will be described later.

The following is an explanation of an operation example of the work content analyzing apparatus configured as described above and to which the work content analyzing method according to the first embodiment is applied.

Figure 5:
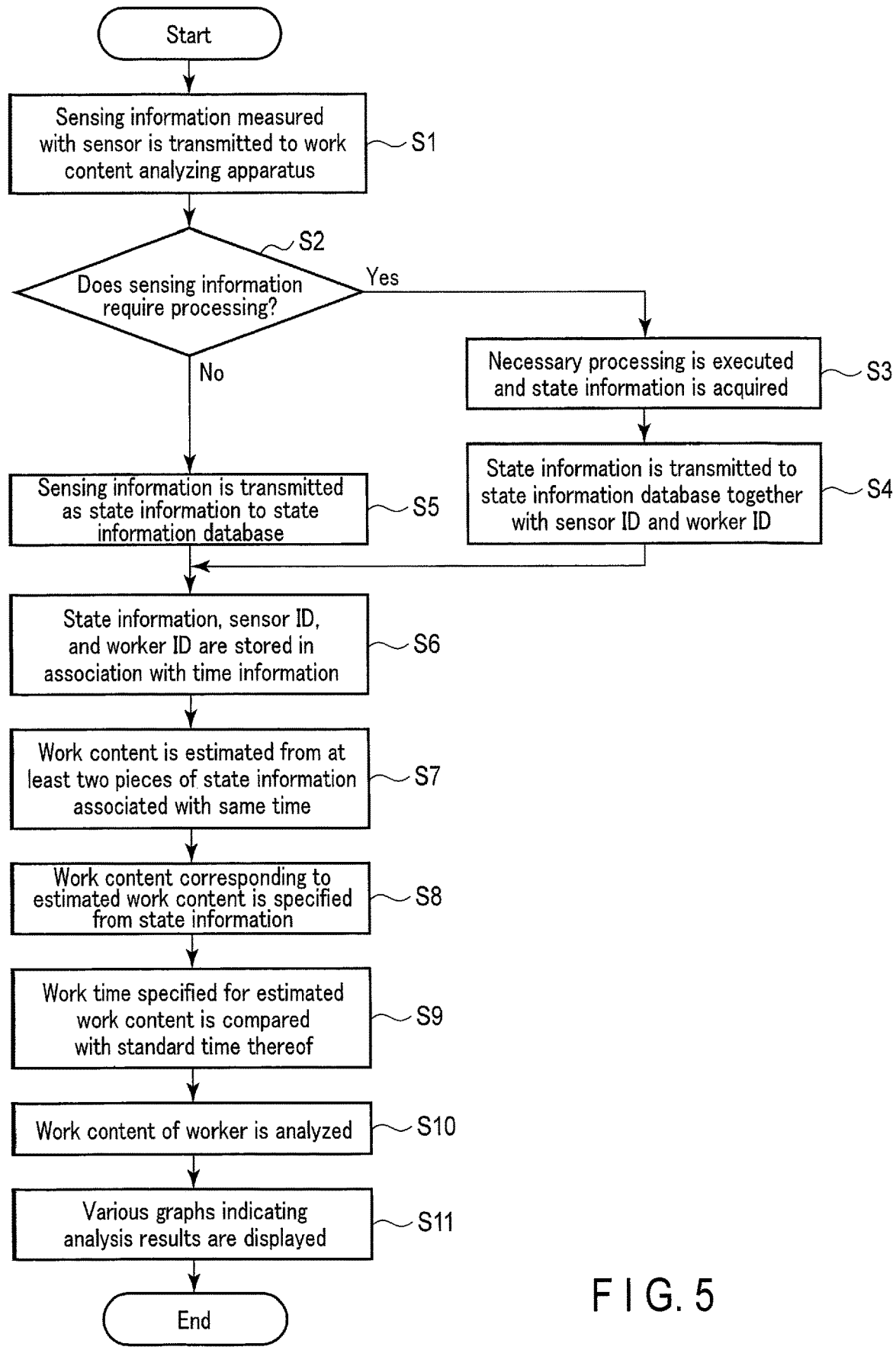
FIG. 5 is a flowchart illustrating an operation example of the work content analyzing apparatus to which the work content analyzing method according to the first embodiment is applied.

FIG. 5 is a flowchart illustrating an operation example of the work content analyzing apparatus to which the work content analyzing method according to the first embodiment is applied.

To analyze the work content of the worker 100, it is required to attach the sensor 110 to each of the workers 100. A plurality of types of sensors 110 may be attached to each of the workers 100, not one type of sensor 110.

Each of the sensors 110 is an IoT device to visualize the motion of the worker 100. Examples of the sensors 110 include a position sensor measuring the position of the worker 100 via a GPS function, a WiFi function, a Bluetooth function, or a beacon 125, an acceleration sensor detecting motion of the hand of the worker 100, a vital sensor measuring vital information of the worker 100, such as the pulse of the worker 100, a microphone detecting voice of the worker 100, a sound sensor detecting sound around the worker 100, and a camera imaging an image on the line of sight of the worker 100, but are not limited thereto.

To analyze the work content of the worker 100, it is possible to use image information from the camera 115 installed in a fixed point and/or sensing information from the sensor attached to the equipment 116.

Each of the sensors 110 is provided with a unique sensor ID and associated with the worker ID of the worker 100 to which the sensor 110 is attached. The camera 115 is provided with a unique sensor ID.

Sensing information measured with each of the sensors attached to the workers 100 and/or the equipment 116 is transmitted from the sensor 110 to the work content analyzing apparatus 10 via the communication network 70 together with the sensor ID and the worker ID. Image information serving as sensing information measured with the camera 115 is transmitted to the work content analyzing apparatus 10 via the communication network 70 together with the sensor ID (S1).

The pieces of sensing information transmitted to the work content analyzing apparatus 10 are received with the communication unit 15 together with the sensor IDs and, if exist, the worker IDs, and transmitted from the communication unit 15 to the processing module 21. The processing module 21 determines whether sensing information requires processing (S2).

When the sensing information requires processing (S2: Yes), the processing module 21 executes processing necessary for the sensing information, and acquires state information from the sensing information (S3).

At Step S2, examples of the sensing information requiring processing include image information from the camera 115. Processing for the image information is, for example, specifying the imaged worker 100 from the image information by an AI technique or the like, specifying the worker ID of the worker 100, detecting the motion information and the positional information of the specified worker 100, and using the detected motion information and the positional information as state information. As described above, when image information is processed, the processing module 21 particularly functions as an image processing module.

In addition, sensing information from the acceleration sensor may also be subjected to processing using an AI technique or the like. Sensing information requiring processing with the processing module 21 is not limited thereto.

The state information is transmitted from the processing module 21 to the state information database 32 together with the sensor ID and the worker ID (S4).

Examples of the sensing information requiring processing include image information from the camera 115 and sensing information from the acceleration sensor.

When processing is executed for the image information from the camera 115, the processing module 21 functions as an image processing module. In the processing module 21, the imaged worker 100 is specified from the image information by an AI technique or the like, the worker ID of the worker 100 is specified, the motion information and the positional information of the specified worker 100 are detected, and the detected motion information and the positional information are used as state information.

In addition, when processing is executed for the sensing information from the acceleration sensor, in the processing module 21, state information is acquired by executing processing to which an AI technique or the like is applied.

By contrast, in the case of sensing information requiring no processing (S2: No), no processing is executed for the sensing information in the processing module 21, and the sensing information is transmitted as state information to the state information database 32 together with the sensor ID and the worker ID (S5).

In the state information database 32, the state information, the sensor ID, and the worker ID transmitted at Step S4 and Step S5 are stored in associated with the time information (S6).

The determination module 27 always monitors operations of the CPU 12 and/or the communication unit 15, and always determines whether the work content analyzing apparatus 10 normally operates. In accordance with it, when no state information can be acquired although the determination module 27 determines that the work content analyzing apparatus 10 normally operates, the processing module 21 stores state information "0" is stored in the state information database 32. By contrast, when no state information can be acquired in the case where the determination module 27 determines that the work content analyzing apparatus 10 does not normally operate, the processing module 21 store state information "−1" in the state information database 32, as illustrated in FIG. 3B.

In addition, as explained with reference to FIG. 4A and FIG. 4B, if necessary, arithmetic processing is executed with the processing module 21, and state information is determined.

Thereafter, in the estimation module 22, the work content executed by the worker 100 is estimated (S7) on the basis of at least two pieces of state information associated with the same time in the state information of the worker 100 stored in the state information database 32. The estimation result is stored in the state information database 32 in association with the corresponding state information.

In the specification module 23, the work time spent for the work content estimated with the estimation module 22 is specified on the basis of the state information of the worker 100 stored in the state information database 32 and the time information associated with the state information (S8).

In the work time comparison module 24, the work time specified with the specification module 23 is compared with the standard time stored in the standard time database 33 for the work content estimated with the estimation module (S9). The result of the comparison may be a difference between the work time and the corresponding standard time or the rate (percentage) of the work time for the standard time. For example, when the work content is estimated to be "manual work" with the estimation module 22, the work time specified for the "manual work" with the specification module 23 is 30 minutes, and the standard time "33 minutes" is stored in the standard time database 33 as the standard time for the manual work, the comparison result "standard time+3 minutes" or "standard time+10%" is acquired for the manual work with the work time comparison module 24.

In the analysis module 25, the work content of the worker 100 is analyzed from various points of view using the comparison result and/or information stored in the state information database 32 and the standard time database 33 (S10).

Various analysis results executed with the analysis module 25 are displayed in a graph or the like on the display unit 16 and/or the external terminal 130 with the display control module 26 (S11). Examples of the graphs include not only a comparison result of the work time acquired with the work time comparison module 24 and a work result diagram prepared on the basis of the time period specified with the specification module 23, but also graphic display as explained hereinafter.

Figure 6:
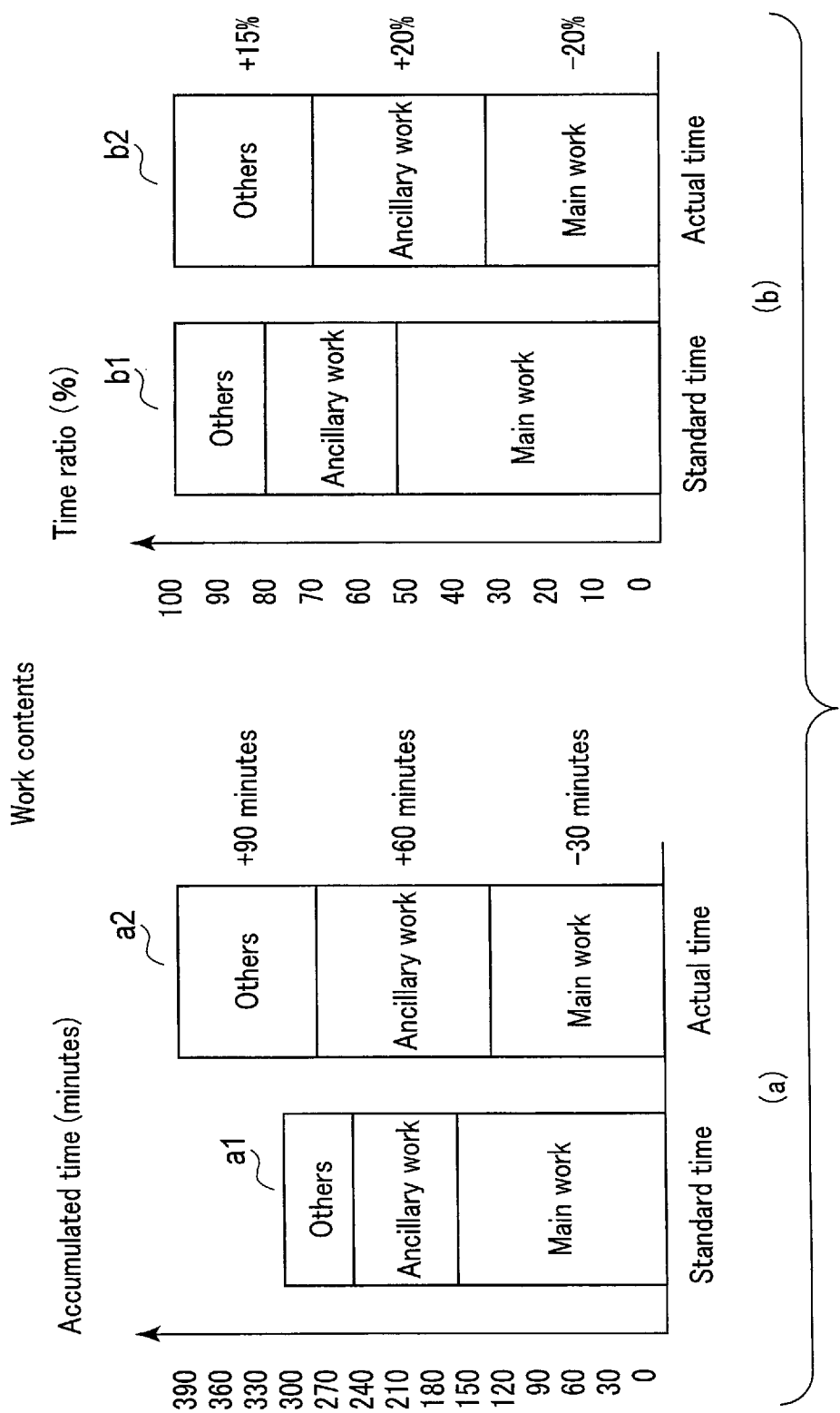
FIG. 6 is a graphic display example illustrating time required for each of work contents.

FIG. 6 is a graphic display example illustrating time required for each of work contents.

In this example, suppose that the standard time database 33 stores standard time (main work: 150 minutes, ancillary work: 90 minutes, and others: 60 minutes) for each of the main work, the ancillary work, and the others.

In addition, suppose that the state information database 32 stores the work contents (main work, ancillary work, and others) estimated with the estimation module 22 and the work time (120 minutes, 150 minutes, 120 minutes) for each of the work contents specified with the specification module 23 in association with the state information of the worker 100.

FIG. 6(*a*) illustrates accumulated time (minutes) of each of the work contents for the standard time and the actual time separately.

As described above, because the standard time database 33 stores "150 minutes", "90 minutes", and "60 minutes" as the standard time of the main work, ancillary work, and the others, respectively, the analysis module 25 prepares a graph in which the standard time is accumulated for each of the work contents, as illustrated in the standard time graph a1, by referring to the standard time database 33.

In the same manner, because the state information database 32 stores the work contents (main work, ancillary work, and others) and the work time (120 minutes, 150 minutes, 120 minutes) for each of the work contents in association with the state information of the worker 100, the analysis module 25 prepares a graph in which the work time is accumulated for each of the work contents, as illustrated in the actual time graph a2, by referring to the state information database 32. In addition, difference time (minutes) from the time for the same work content of the standard time graph a1 is illustrated on the side of each of the work contents of the actual time graph a2.

This example illustrates that the actual time of the worker 100 for the main work is shorter than the standard time by 30 minutes, the actual time thereof for the ancillary work is longer than the standard time by 60 minutes, and the actual time thereof for the others is longer than the standard time by 90 minutes.

By contrast, FIG. 6(*b*) illustrates the time ratio of each of the work contents by percentage.

The standard time graph b1 and the actual time graph b2 are graphs illustrating the time ratio of each of the work contents by percentage for the standard time graph a1 and the actual time graph a2, respectively, with the whole time set to 100%.

The graphic displays of FIG. 6(*a*) and FIG. 6(*b*) described above illustrate that the actual time for the main work is shorter than the standard time, and the percentage thereof for the whole work is lower than that of the standard time. Conversely, the actual time of each of the ancillary work and the others is longer than the standard time and the percentage thereof for the whole work is higher than that of the standard time. Accordingly, this enables clarification of specific measures to enhance the work efficiency, that is, increasing the time spent for the main work and reducing the time spent for the ancillary work and the others to shorter time.

Such graphic displays visualize the work contents and enables specification of waste hidden in the work. This structure clarifies specific points to be improved to enhance the work efficiency, and enables efficient formulation of an improvement plan.

In addition, when the producibility is enhanced by the effect of improvement, the enhancement leads to suppression of the production costs and/or procurement costs.

FIG. 7 is a flowchart for explaining a flow of business operation improvement.

As described above, with the work content analyzing apparatus to which the work content analyzing method according to the first embodiment is applied, as illustrated in the flowchart of FIG. 7, by acquiring sensing information from the sensors 110 attached to the worker 100 and/or the equipment 116 and from the camera 115 (S21) installed in a fixed point, various pieces of state information relating to the work is collected (S22), the state information is stored in the state information database 32 (S23), and various analyses are executed (S24). As a result of analyses, because the work contents are visualized and waste hidden in the work is specified, it is possible to form a specific and effective plan to enhance the producibility (S25).

As described above, the work content analyzing apparatus 10 is capable of analyzing work contents, without requiring any personnel to acquire sensing information or requiring any renovation of the equipment of the factory.

Thereafter, the improvement plan (S26) is executed, and improvement of the producibility is checked (S27) as an effect of execution of the improvement plan. When improvement of the producibility is achieved, it leads to suppression of the production costs and/or the procurement costs.

Second Embodiment

The following is an explanation of a work content analyzing apparatus to which a work content analyzing method according to the second embodiment is applied.

Work content analysis for the individual workers may lead to personal attacks. In this case, the worker may lose motivation for production and feel difficulty in accepting the work content analysis results obediently. In such a case, there is the possibility that the work content analysis does not lead to improvement of producibility.

By contrast, when evaluation is executed for the work group, not a person, evaluation does not lead to personal attacks, and the work content analysis results are more easily accepted. This structure enhances the cooperation awareness in the group, and is expected to lead to improvement of producibility.

Examples of the group include the case where the group includes a plurality of workers organized as a work team, the case where the group includes a plurality of workers executing the same work, such as inspection work and assembly work, and the case where the group includes a plurality of workers categorized according to the role, such as the group leader and the inspection worker.

For this reason, the work content analyzing apparatus to which the work content analyzing method according to the second embodiment is applied executes work content analysis for a group, such as a work team.

Accordingly, in the present embodiment, each of the workers belongs to any of groups into which each of the workers is classified in advance, and work content analysis is executed for each of the groups, not each of the workers, unlike the first embodiment.

Configuration of the work content analyzing apparatus to which the work content analyzing method according to the second embodiment is applied can be explained with reference to FIG. 1. For this reason, the following explanation illustrates points different from the first embodiment with reference to FIG. 1, with an overlapping explanation omitted.

In the present embodiment, each of the workers 100 is is classified into any of groups. For example, the groups may be work groups in each of which the workers execute work together.

In accordance with the structure, the worker ID of each of the workers 100 includes not only the identification information identifying the worker 100 but also group information designating the group to which the worker 100 belongs. For example, when the group information is a group number assigned to the group in advance, the worker ID may be numeral information formed of the employee number and the group number connected in series.

For this reason, the worker database 31 stores the worker IDs each including identification information identifying the worker and identification information designating the group to which the worker belongs for the respective workers 100. In the same manner, the state information stored in the state information database 32 together with the time information is stored in association with the worker IDs described above.

The estimation module 22 estimates the work content executed by the group, on the basis of at least two pieces of state information associated with the same time in state information stored in the state information database 32 for a plurality of workers 100 belonging to the same group.

For example, the following is an explanation of the case where at least two pieces of state information are positional information from the positional sensor and voice information of the microphone of the worker 100 (#1) and positional information from the positional sensor and voice information of the microphone of the worker 100 (#2), as an example of the case where at least two pieces of state information are state information of the two workers 100 (#1) and 100 (#2) belonging to the same group. In this case, when both positional information of the worker 100 (#1) and positional information of the worker 100 (#2) indicate that the worker is in the work area, and the voice information of the worker 100 (#1) and the voice information of the worker 100 (#2) indicate that the worker 100 (#1) and the worker 100 (#2) are talking about the work, the estimation module 22 can estimate that the group is working, and estimate the work content on the basis of the contents of the talk.

The example described above is a mere example, and the estimation module 22 can estimate various work contents executed by the group, on the basis of combinations of other various pieces of state information from the workers belonging to the same group. The estimation module 22 stores the estimation results in the state information database 32 in association with the state information of the corresponding workers 100.

The specification module 23 specifies the work time corresponding to the work content estimated with the estimation module 22, on the basis of the state information stored in the state information database 32 for the workers 100 belonging to the same group. For example, when the estimation module 22 estimates that the manual work is performed in the group, the specification module 23 specifies the time period ranging from the time corresponding to the time information corresponding to the start timing of the manual work to the time corresponding to the time information corresponding to the end timing of the manual work, as the work time spent for the manual work. The specification module 23 stores the work time specified as described above in the state information database 32 in association with the corresponding state information of the workers 100.

The work time comparison module 24 compares the work time specified with the specification module 23 with the standard time stored in the standard time database 33 for the work content estimated with the estimation module 22, in the same manner as the first embodiment.

The analysis module 25 analyzes the work content of the group on the basis of the work content estimated with the estimation module 22 and the work time specified with the specification module 23. As another example, the analysis module 25 analyzes the work content of each of the workers 100 belonging to the group on the basis of the work content estimated with the estimation module 22 and the work time specified with the specification module 23, and analyzes the work content for the whole group on the basis of results of the analysis.

The following is an operation example of the work content analyzing apparatus configured as described above and to which the work content analyzing method according to the second embodiment is applied.

Figure 8:
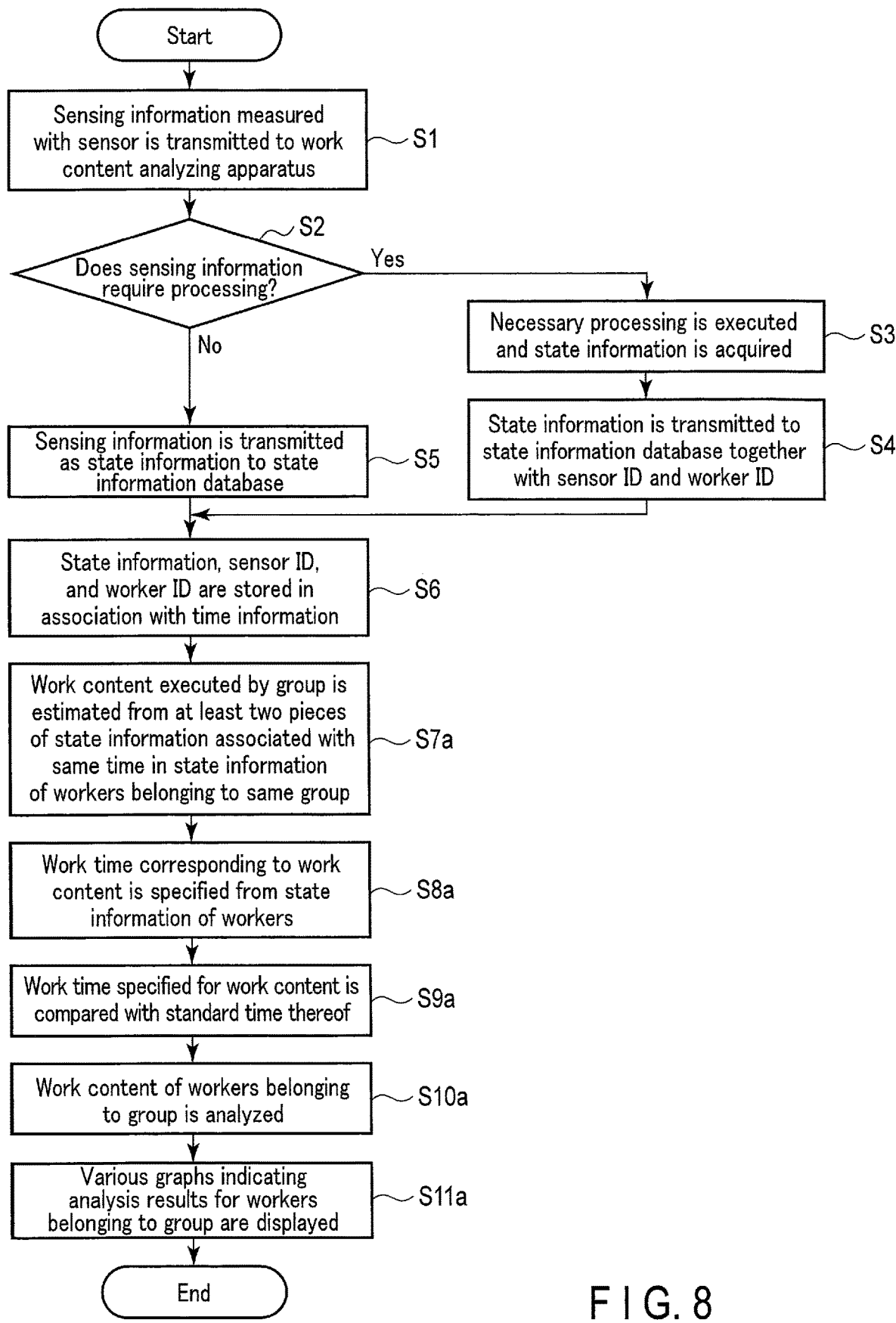
FIG. 8 is a flowchart illustrating an operation example of a work content analyzing apparatus to which a work content analyzing method according to a second embodiment is applied.

FIG. 8 is a flowchart illustrating an operation example of the work content analyzing apparatus to which the work content analyzing method according to the second embodiment is applied.

In FIG. 8, the same processing steps as those in FIG. 5 are provided with the same step numbers as those in FIG. 5, and only different details will be explained, with an overlapping explanation omitted.

Each of the workers 100 is provided with one or a plurality of types of sensors 110, in the same manner as the first embodiment. In addition, the camera 115 is installed in a fixed point, in the same manner as the first embodiment.

Each of the sensors 110 is provided with a sensor ID and associated with a worker ID. The worker ID includes not only identification information of the worker 100 but also the identification number of the group to which the worker 100 belong.

For this reason, in the following explanation, suppose that the worker ID includes not only identification information of the worker 100 but also the identification number of the group to which the worker 100 belong in the explanation of FIG. 5.

The estimation module 22 estimates the work content executed by the group on the basis of at least two pieces of state information associated with the same time in the state information stored in the state information database 32 for the workers 100 belonging to the same group (S7a).

The specification module 23 specifies the work time spent for the work content estimated with the estimation module 22, on the basis of the state information stored in the state information database 32 for the workers 100 belonging to the same group (S8a).

The work time comparison module 24 compares the work time specified with the specification module 23 with the standard time stored in the standard time database 33 for the work content estimated with the estimation module 22, in the same manner as the first embodiment (S9a).

The analysis module 25 analyzes the work content of the group on the basis of the work content estimated with the estimation module 22 and the work time specified with the specification module 23. As another example, the analysis module 25 analyzes the work content of each of the workers 100 belonging to the group on the basis of the work content estimated with the estimation module 22 and the work time specified with the specification module 23, and analyzes the work content for the whole group on the basis of results of the analysis (S10a).

The analysis can be executed from various points of view using information stored in the state information database 32 and the standard time database 33, in the same manner as the first embodiment.

The display control module 26 displays a graph indicating various analysis results executed for the group with the analysis module 25 on the display unit 16 and/or the external terminal 130 (S11a).

The following is an explanation of graphic display displayed on the display unit 16 and/or the external terminal 130 on the basis of the analysis results acquired with the analysis module 25.

Figure 9:
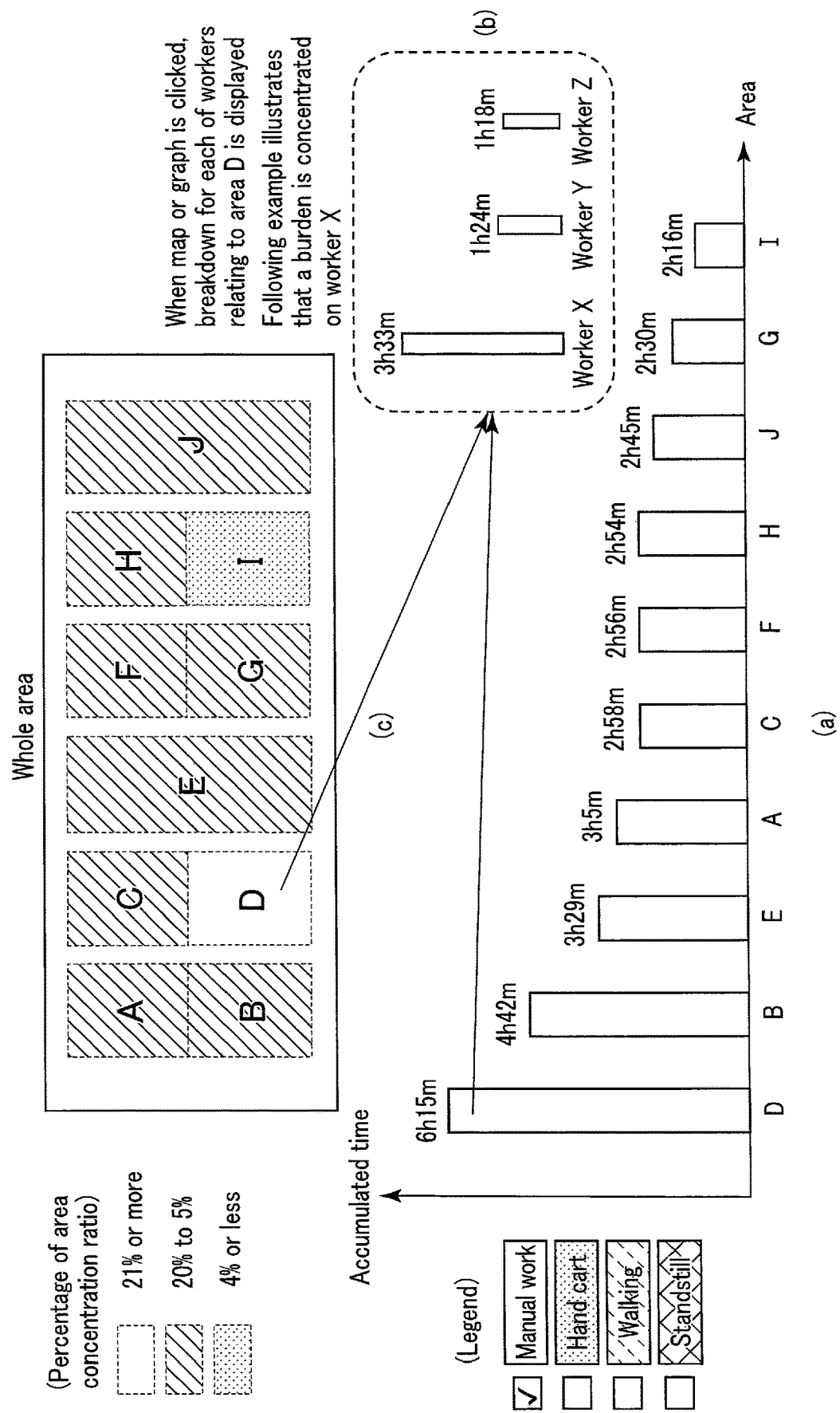
FIG. 9 is a graphic display example illustrating entry frequency and entry time length for each of areas in a factory by all workers in a group.

FIG. 9 is a graphic display example illustrating entry frequency and entry time length for each of areas in a factory by all workers in a group.

FIG. 9(a) illustrates accumulated time for which the workers 100 stayed for each of areas A to J in a day (or a week) for manual work. In FIG. 9(a), the vertical axis indicates the accumulated time, and the horizontal axis indicates the area.

FIG. 9(a) illustrates that the workers belonging to the group stayed in the area D for manual work for 6 hours and 15 minutes as the accumulated time. In addition, FIG. 9(d) illustrates that the breakdown of the accumulated time "6 hours and 15 minutes" is that "the worker X stayed for 3 hours and 33 minutes, the worker Y stayed for 1 hour and 24 minutes, and the worker Z stayed for 1 hour and 18 minutes".

FIG. 9(c) illustrates results of classification of the areas into three classes on the basis of the ratio (area concentration ratio) of stay time of each of the areas to the sum total of the accumulated time of all the areas illustrated in FIG. 9(a). In FIG. 9(c), each of the areas is schematically displayed in accordance with the positional relation of the areas according to the actual layout in the factory. The example of FIG. 9(c) illustrates that only the area D has an area concentration ratio of 21% or more for the manual work, only the area I has an area concentration ratio of 4% or less for the manual work, and the other areas have area concentration ratios of 5 to 20%.

In addition, as illustrated in the legend of FIG. 9(a), display as illustrated in FIG. 9 is possible in accordance with each of work contents of the workers 100, such as the cart work, walking, and standstill, as well as manual work.

Such display as described above enables visualization of the actual state of the action on site for the whole group, for example, on which area the workers are concentrated/not concentrated at which work, and which worker bears a large/small burden.

Figure 10:
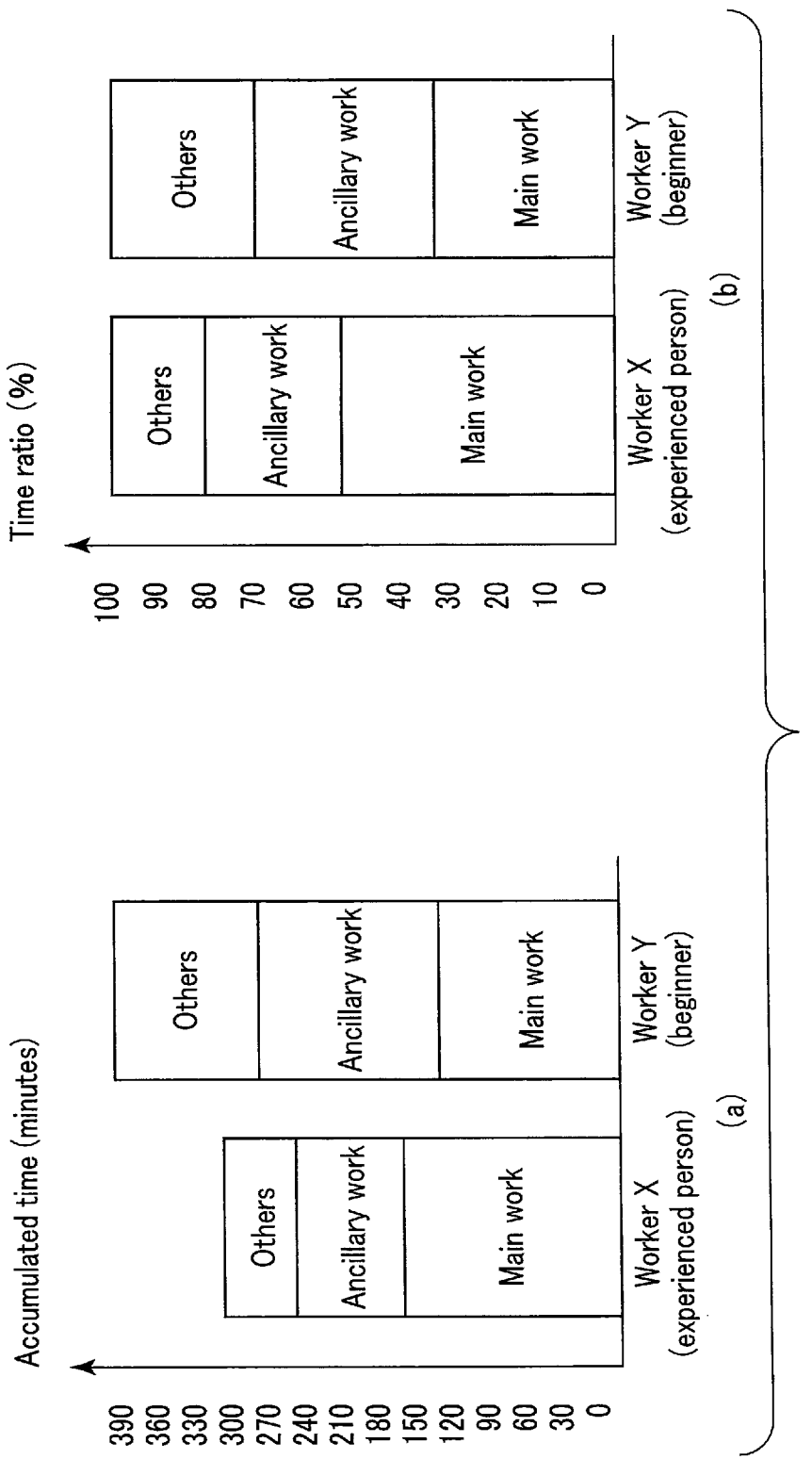
FIG. 10 is a graphic display example illustrating details of work time results for the respective work contents.

FIG. 10 illustrates another example of comparison of work results between a skilled person and an unskilled person.

FIG. 10 is a graphic display example illustrating details of work time results for the respective work contents.

The work contents are classified into "main work", "ancillary work", and "others" in this example.

In FIG. 10(a), the vertical axis indicates the accumulated time. In FIG. 10(b), the vertical axis indicates the time ratio (%).

For example, FIG. 10(a) and FIG. 10(b) illustrates comparison of the work time results between a skilled person, such as an experienced person, and an unskilled person, such as a beginner. FIG. 10(a) and FIG. 10(b) illustrates that the worker Y being a beginner has longer total work time, a smaller ratio for the main work, and larger ratios for the ancillary work and others, in comparison with the worker X being an experienced person. The results specifically clarify that the item to be improved to enhance the work efficiency of beginners is to reduce the ratio of the ancillary work and/or others and enhance the ratio of the main work to shorten the total work time.

As described above, the work content analyzing apparatus to which the work content analyzing method according to the second embodiment enables execution of the work content analysis, which is executed for the individual workers in the first embodiment, for each of groups.

With this structure, the individual workers are not criticized, and each of the workers can more easily accept the analysis results and/or the improvement item acquired from the analysis results. This structure consequently enables each of the workers to voluntalily and positively tackle business operation improvement, and is expected to create the cooperation awareness in the group. This is expected to activate the group, such as increase in communication in the group and active tackling of necessary business operation improvement, such as change of the work process and/or the layout.

In addition, this structure is greatly expected to lead to cost reduction, such as improvement in producibility and suppression of production costs and/or procurement costs.

The explanation described above illustrates considering the work time of the experienced person and/or the breakdown of the work time to improve the work efficiency, but other factors may be considered and used to improve the work efficiency, such as the moving place (for example, the place to which the experienced person went, while the beginner did not) and/or to moving route (the route through which the experienced person moved, while the beginner moved through another route) of the experienced person.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A work content analyzing apparatus analyzing work content of a worker on the basis of a state of the worker, the apparatus comprising:
  at least one sensor attached to or installed around the worker to monitor the state of the worker and to output state information indicating the state of each of the worker or a plurality of workers in association with time information and identification information of the worker;
  a first database storing the state information indicating the state of each of the worker or the plurality of workers in association with the time information and identification information of the worker, the state information including at least any one of positional information of the worker, motion information indicating whether a hand of the worker is moving or not, and information indicating an operating state of an equipment around the worker;
  a determination unit determining whether the work content analyzing apparatus is operating with a required performance or not;
  a processing unit storing first fixed data as the state information in the first database when the determination unit determines that the work content analyzing apparatus is operating with the required performance, and storing second fixed data as the state information in the first database when the determining unit determines that the work content analyzing apparatus is not operating with the required performance, in the case where no state information can be acquired;

an estimation unit estimating the work content executed by the worker on the basis of at least two pieces of state information associated with same time in the state information stored in the first database, the work content including indicating whether the worker is doing work or is not doing work;

a specification unit specifying work time spent for each estimated work content indicating whether the worker is doing work or is not doing work on the basis of the state information stored in the first database and the time information associated with the state information;

an analysis unit analyzing the work content on the basis of the estimated work content and the specified work time; and a display to graphically display an output of the analysis unit.

2. The work content analyzing apparatus analyzing work content of a worker on the basis of a state of the worker, the apparatus comprising:

at least one sensor attached to or installed around the worker to monitor the state of the worker and to output state information indicating the state of each of the worker or a plurality of workers in association with time information and identification information of the worker;

a first database storing the state information indicating the state of each of the worker or the plurality of workers in association with the time information and identification information of the worker, the state information including at least any one of positional information of the worker, motion information indicating whether a hand of the worker is moving or not, and information indicating an operating state of an equipment around the worker;

a processing unit acquiring second state information by executing averaging and/or majority decision processing for one or a plurality of pieces of first state information in the pieces of the state information, and storing the first state information indicating a plurality of pieces of position information in a short period and the second state information in the first database;

an estimation unit estimating the work content executed by the worker on the basis of a least two pieces of state information associated with same time in the state information stored in the first database, the work content including indicating whether the worker is doing work or is not doing work;

a specification unit specifying work time spent for each estimated work content indicating whether the worker is doing work or is not doing work on the basis of the state information stored in the first database and the time information associated with the state information;

an analysis unit analyzing the work content on the basis of the estimated work content and the specified work time; and a display to graphically display an output of the analysis unit.

3. The work content analyzing apparatus according to claim 1 or 2, wherein the first database stores information of the sensor in association with identification information of the worker to which the sensor is attached or identification information of the worker existing within a predetermined distance from a place in which the sensor is installed.

4. The work content analyzing apparatus according to claim 1 or 2, further comprising:

a second database storing standard time determined in advance for each of the work contents; and a work time comparison unit comparing the specified work time with the corresponding standard time for the estimated work content.

5. The work content analyzing apparatus according to claim 4, wherein a result of the comparison includes a difference between the work time and the corresponding standard time or a ratio of the work time to the corresponding standard time.

6. The work content analyzing apparatus according to claim 5, further comprising:

a display control unit displaying the difference or the ratio for each of the work contents.

7. The work content analyzing apparatus according to claim 5, wherein the analysis unit further analyzes the work content of the worker on the basis of the difference or the ratio.

8. The work content analyzing apparatus according to claim 1 or 2, further comprising:

a display control unit displaying an analysis result acquired with the analysis unit.

9. The work content analyzing apparatus according to claim 8, wherein the specification unit further specifies a time period corresponding to the estimated work content on the basis of the state information stored in the first database, and the display control unit displays a work result diagram displaying the work content on a time axis as the analysis result on the basis of the specified time period.

10. The work content analyzing apparatus according to claim 1 or 2, wherein each of the workers belongs to any of groups into which each of the workers is classified in advance, the identification information includes group information designating the group to which the worker belongs, the estimation unit estimates the work content executed by the group on the basis of at least two pieces of state information associated with same time in state information stored in the first database for the workers belonging to same group, the specification unit specifies work time spent for the estimated work content on the basis of the state information stored in the first database for the workers belonging to the same group, and the analysis unit analyzes the work content of the group on the basis of the estimated work content and the specified work time.

11. Work content analyzing apparatus according to claim 1 or 2, wherein the state information further includes at least any one of movement information indicating whether the worker is moving or not, vital information of the worker, voice information of the worker, ambient sound information of the worker, and ambient image information of the worker.

12. The work content analyzing apparatus according to claim 1 or 2, wherein the time information stored in the first database is synchronized with clocking means of a system connected with the work content analysis device itself.

13. The work content analyzing apparatus according to claim 1 or 2, wherein the work content estimated with the estimation unit includes a break for the worker.

14. A work content analyzing method executed with a work content analyzing apparatus to analyze work content of a worker on the basis of a state of the worker, the method comprising:
- sensing, by at least one sensor attached to or installed around the worker, the state of the worker and outputting state information indicating the state of each of the worker or a plurality of workers in association with time information and identification information of the worker;
- storing, in a database, the state information indicating the state of each of the worker or the plurality of workers in association with the time information and identification information of the worker, the state information including at least any one of positional information of the worker, motion information indicating whether a hand of the worker is moving or not, and information indicating an operating state of an equipment around the worker;
- determining whether the work content analyzing apparatus is operating with a required performance or not;
- storing first fixed data as the state information in the first database when the determination unit determines that work content analyzing apparatus is operating with the required performance, and storing second fixed data as the state information in the first database when the determination unit determines that the work content analyzing apparatus is not operating with the required performance, in the case where no state information can be acquired;
- estimating the work content executed by the worker on the basis of at least two pieces of state information associated with same time in the state information stored in the database, the work content including indicating whether the worker is doing work or is not doing work;
- specifying work time spent for each estimated work content indicating whether the worker is doing work or is not doing work on the basis of the state information stored in the database and the time information associated with the state information;
- analyzing the work content on the basis of the estimated work content and the specified work time; and
- graphically displaying an output of the analyzing.

15. A non-transitory computer readable medium including a computer program product including a program to analyze work content of a worker on the basis of a state of the worker using at least one sensor attached to or installed around the worker to monitor the state of the worker and to output state information indicating the state of each of the worker or a plurality of workers in association with time information and identification information of the worker; the program causing a computer to achieve:
- a function of storing, in a database, the state information indicating the state of each of the worker or the plurality of workers in association with time information and identification information of the worker, the state information including at least any one of positional information of the worker, motion information indicating whether a hand of the worker is moving or not, and information indicating an operating state of an equipment around the worker;
- a function of determining whether the work content analyzing apparatus is operating with the required performance or not;
- a function of storing fixed first data as the state information in the first database when the determination unit determines that the work content analyzing apparatus is operating with the required performance, and storing second fixed data as the state information in the first data when the determination unit determines that the work content analyzing apparatus is not operating with the required performance, in the case where no state information can be acquired;
- a function of estimating the work content executed by the worker on the basis of at least two pieces of state information associated with same time in the state information stored in the database, the work content including indicating whether the worker is doing work or is not doing work;
- a function of specifying work time spent for each estimated work content indicating whether the worker is doing work or is not doing work on the basis of the state information stored in the database and the time information associated with the state information;
- a function of analyzing the work content on the basis of the estimated work content and the specified work time; and
- a function of graphically displaying an output of the function of analyzing.

16. A work content analyzing system analyzing work content of a worker on the basis of a state of the worker, the system comprising:
- a sensor system acquiring state information transmitted to a work content analyzing apparatus, the sensor system comprising:
  - at least one sensor attached or installed around to the worker to monitor the state of the worker and to output the state information indicating the state of each of the worker or a plurality of workers in association with time information and identification information of the worker;
  - a state information database storing the acquired state information;
  - a communication determination unit determining whether the communication determination unit can communicate with the work content analyzing apparatus or not; and
  - a transmitter transmitting the state information stored in the state information database to the work content analyzing apparatus for each of predetermined units, when the communication determination unit determines that the communication unit can communicate with the work content analyzing apparatus;
- the work content analyzing apparatus comprising:
  - a first database storing the state information indicating the state of each of the worker or the plurality of workers in association with the time information and identification information of the worker, the state information including at least any one of positional information of the worker, motion information indicating whether a hand of the worker is moving or not, and information indicating an operating state of an equipment around the worker;
  - a determination unit determining whether the work content analyzing apparatus is operating with a required performance or not;
  - a processing unit storing first fixed data as the state information in the first database when the determination unit determines that the work content analyzing apparatus is operating with the required performance, and storing second fixed data as the state information in the first data base when the determination unit determines that the work content analyzing apparatus is not operating with the required performance, in the case where no state information can be acquired;

an estimation unit estimating the work content executed by the worker on the basis of at least two pieces of state information associated with same time in the state information stored in the first database, the work content including indicating whether the worker is doing work or is not doing work;

a specification unit specifying work time spent for each estimated work content indicating whether the worker is doing work or is not doing work on the basis of the state information stored in the first database and the time information associated with the state information;

an analysis unit analyzing the work content on the basis of the estimated work content and the specified work time; and a display to graphically display an output of the analysis unit.

17. The system according to claim 16, the sensor further comprising:

a radio wave receiver receiving radio waves from a ratio wave transmitter capable of changing radio wave intensity thereof.

18. The system according to claim 16, wherein the sensor is attached to the worker or installed in the vicinity of the worker.

19. The system according to claim 18, wherein the sensor is attached to any of a front surface of body, a left or right side of a waist, an arm, a wrist, a neck, a shoulder, an ear, and a head of the worker, when the sensor is attached to the worker.

20. The system according to claim 19, wherein the sensor is attached to a dominant arm or a dominant hand of the worker when motion information is acquired.

* * * * *